United States Patent
Chang et al.

(10) Patent No.: US 11,259,210 B2
(45) Date of Patent: Feb. 22, 2022

(54) METHODS FOR DATA TRAFFIC SWITCHING AND NETWORK SELECTION

(71) Applicant: MEDIATEK INC., Hsinchu (TW)

(72) Inventors: Jen-Chih Chang, Hsinchu (TW); Tsung-I Lin, Hsinchu (TW); Bin-Sung Liao, Hsinchu (TW); Xian-Ren Wu, Hsinchu (TW); Ko-Hsu Su, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 110 days.

(21) Appl. No.: 16/867,975

(22) Filed: May 6, 2020

(65) Prior Publication Data
US 2021/0219181 A1    Jul. 15, 2021

Related U.S. Application Data

(60) Provisional application No. 62/960,205, filed on Jan. 13, 2020.

(51) Int. Cl.
*H04W 28/08*   (2009.01)
*H04W 48/18*   (2009.01)
(Continued)

(52) U.S. Cl.
CPC ..... *H04W 28/0819* (2020.05); *H04W 28/085* (2013.01); *H04W 28/0967* (2020.05); *H04W 48/18* (2013.01)

(58) Field of Classification Search
CPC .......... H04W 28/0819; H04W 28/085; H04W 28/0967; H04W 48/18; H04W 28/0983;
(Continued)

(56) References Cited

U.S. PATENT DOCUMENTS 9,491,632 B2 * 11/2016 Sadek ................... H04J 3/16
9,699,795 B2 *  7/2017 Ayadurai ........... H04W 72/085
(Continued)

FOREIGN PATENT DOCUMENTS

CN      101695019 A     4/2010

OTHER PUBLICATIONS

"What kind of black technology is Huawei Link Turbo?;" Web: https://kknews.cc/tech/98r2qzq.html; Jan. 2019; pp. 1-4.
(Continued)

*Primary Examiner* — Ahmed Elallam
(74) *Attorney, Agent, or Firm* — McClure, Qualey & Rodack, LLP (57) ABSTRACT

A method executed by a mobile communication device is provided. The method includes at least the following steps: connecting to a non-cellular network for communicating data traffic in a first channel; determining an idle timeslot ratio of the first channel used by the non-cellular network in a first period of time; and in response to the idle timeslot ratio in the first period of time being lower than a first threshold, switching the data traffic communication from the non-cellular network to a cellular network or another non-cellular network, or switching the data traffic communication from the first channel to a second channel used by the non-cellular network, or providing a notification to a user of the mobile communication device.

18 Claims, 7 Drawing Sheets

(51) Int. Cl.
*H04W 88/06* (2009.01)
*H04W 74/08* (2009.01)

(58) Field of Classification Search
CPC . H04W 28/0284; H04W 74/08; H04W 76/34; H04W 88/06; H04W 16/14; H04W 72/1215; H04W 74/0808; H04L 27/0006
See application file for complete search history.

(56) References Cited

U.S. PATENT DOCUMENTS

| | | | |
|---|---|---|---|
| 9,756,611 B2* | 9/2017 | Yavuz | H04W 72/082 |
| 9,913,178 B2* | 3/2018 | Lee | H04W 36/0072 |
| 10,219,162 B1* | 2/2019 | Sun | H04W 72/0453 |
| 10,327,164 B2* | 6/2019 | Andreoli-Fang | H04W 76/15 |
| 10,375,711 B2* | 8/2019 | Sadek | H04W 72/1215 |
| 10,602,527 B2* | 3/2020 | Xia | H04W 72/085 |
| 10,743,325 B2* | 8/2020 | Xia | H04J 3/1694 |
| 2011/0032911 A1 | 2/2011 | Choi et al. | |
| 2012/0113806 A1 | 5/2012 | Gong et al. | |
| 2016/0345233 A1 | 11/2016 | Bao et al. | |
| 2017/0181178 A1 | 6/2017 | Gokturk et al. | |

OTHER PUBLICATIONS

English language translation of "What kind of black technology is Huawei Link Turbo?" (Jan. 2019).

"Link Turbo comprehensive analysis: principles, details, testing;" Web: https://www.youtube.com/watch?v=KzQ7oQmFAss; Dec. 2018; pp. 1.

"ISO/IEC/IEEE International Standard—Information technology—Telecommunications and information exchange between systems Local and metropolitan area networks—Specific requirements Part 11: Wireless LAN Medium Access Control (MAC) and Physical Layer (PHY) Specifications;" International Standard ISO/IEC/IEEE; Nov. 2012; pp. 1-2798.

Chinese language office action dated Oct. 4, 2021, issued in application No. TW 109145672.

* cited by examiner

METHODS FOR DATA TRAFFIC SWITCHING AND NETWORK SELECTION

CROSS REFERENCE TO RELATED APPLICATIONS

This Application claims priority of U.S. Provisional Application No. 62/960,205, filed on Jan. 13, 2020, the entirety of which is incorporated by reference herein.

BACKGROUND OF THE APPLICATION

Field of the Application

The application generally relates to wireless communications, and more particularly, to methods for data traffic switching and network selection.

Description of the Related Art

With growing demand for ubiquitous computing and networking, various wireless technologies have been developed, including cellular technologies and non-cellular technologies. For example, cellular technologies may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and New Radio (NR) technology, and others. Non-cellular technologies may include Wireless-Fidelity (Wi-Fi) technology, Bluetooth (BT) technology, and Zigbee technology, etc.

Nowadays, a mobile communication device, such as a smartphone, a tablet, an Internet of Things (IOT) device, a telematics device, etc., may support both cellular and non-cellular technologies, to provide the user with flexibility of wireless communications at all times via the supported wireless technologies, regardless of his/her geographic location. Taking a smartphone supporting both cellular and non-cellular technologies for example, the user of the smartphone may prefer to use non-cellular connectivity as the main access for data traffic communication due to that non-cellular connectivity generally is more budget friendly than cellular connectivity. In most practices, when it comes to selecting the most suitable non-cellular network from multiple non-cellular networks, the signal qualities of the non-cellular networks are the only basis used during the network selection process.

However, there are situations where the channel used by the non-cellular network having the best signal quality may be congested or the bandwidth of the non-cellular network having the best signal quality may be limited at the Access Point (AP). As a result, the smartphone may stay in the non-cellular network having the best signal quality but seriously degraded throughput of data traffic communication, causing bad user experience.

BRIEF SUMMARY OF THE APPLICATION

In order to solve the aforementioned problem, the present application proposes to use at least the idle timeslot ratio or video decoder information to detect the occurrence of channel congestion or bandwidth limitation of the currently connected non-cellular network. Advantageously, such impacts as long User Interface (UI) latency or throughput degradation, which can be caused by channel congestion or bandwidth limitation of the currently connected non-cellular network, may be avoided by switching to an alternative network, such as a cellular network or another non-cellular network.

In one aspect of the application, a method executed by a mobile communication device is provided. The method comprises the following steps: connecting to a non-cellular network for communicating data traffic in a first channel; determining an idle timeslot ratio of the first channel used by the non-cellular network in a first period of time; and in response to the idle timeslot ratio in the first period of time being lower than a first threshold, switching the data traffic communication from the non-cellular network to a cellular network or another non-cellular network, or switching the data traffic communication from the first channel to a second channel used by the non-cellular network, or providing a notification to a user of the mobile communication device.

In another aspect of the application, a method executed by a mobile communication device is provided. The method comprises the following steps: connecting to a non-cellular network for communicating data traffic in a first channel; obtaining decoder information from a video decoder processing the data traffic; and in response to the decoder information not meeting a requirement of the video traffic, switching the data traffic communication from the non-cellular network to a cellular network or another non-cellular network, or switching the data traffic communication from the first channel to a second channel used by the non-cellular network, or providing a notification to a user of the mobile communication device.

In yet another aspect of the application, a method executed by a mobile communication device is provided. The method comprises the following steps: detecting a plurality of non-cellular networks; determining a respective radio quality indicator and a respective idle timeslot ratio of each of the non-cellular networks; selecting one of the non-cellular networks according to the radio quality indicators and the idle timeslot ratios of the non-cellular networks; and connecting to the selected non-cellular network.

Other aspects and features of the present application will become apparent to those with ordinarily skill in the art upon review of the following descriptions of specific embodiments of the methods for data traffic switching and network selection.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
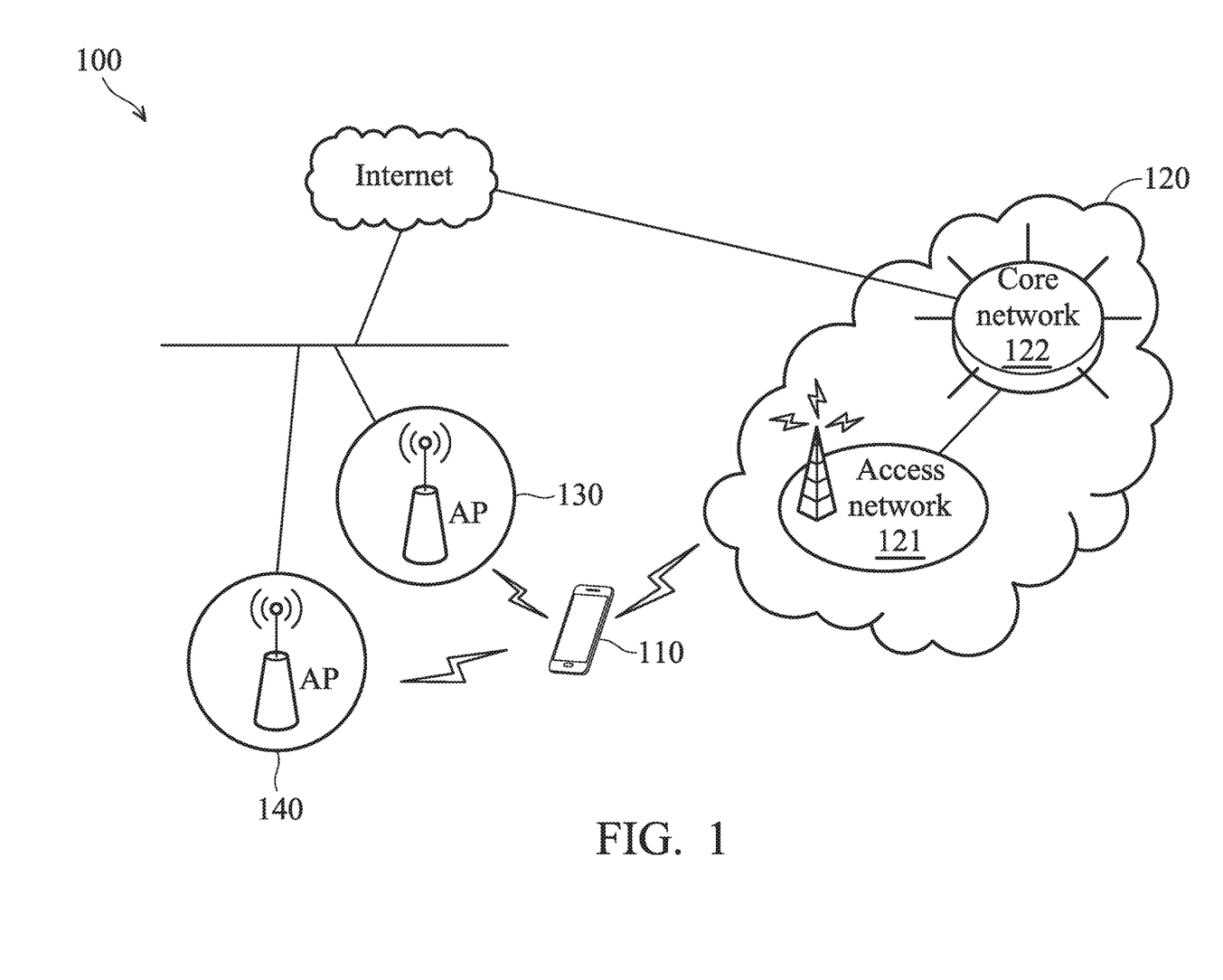
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a mobile communication device 110, a cellular network 120, and multiple non-cellular networks 130~140. The mobile communication device 110 may wirelessly communicate with the cellular network 120 and/or the non-cellular network 130/140 for obtaining mobile services.

The mobile communication device 110 may be referred to as a User Equipment (UE) or Mobile Station (MS), such as a mobile phone (e.g., feature phone or smartphone), a panel Personal Computer (PC), a laptop computer, or any computing device supporting the wireless technologies utilized by the cellular network 120 and the non-cellular networks 130~140.

The cellular network 120 may include an access network 121 and a core network 122. The access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet).

The access network 121 and the core network 122 may each include one or more network nodes for carrying out said functions. For example, if the cellular network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN).

If the cellular network 120 is a WCDMA network, the access network 121 may be a Universal Terrestrial Radio Access Network (UTRAN) and the core network 122 may be a General Packet Radio Service (GPRS) core, which includes a Home Location Register (HLR), at least one Serving GPRS Support Node (SGSN), and at least one Gateway GPRS Support Node (GGSN).

If the cellular network 120 is an LTE/LTE-A/TD-LTE network, the access network 121 may be an Evolved-UTRAN (E-UTRAN) which includes at least an evolved NB (eNB) (e.g., a macro eNB, femto eNB, or pico eNB), and the core network 122 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the cellular network 120 is an NR network, the access network 121 may be a Next Generation-Radio Access Network (NG-RAN) which includes at least a gNB or Transmission Reception Point (TRP), and the core network 122 may be a Next Generation-Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

Each of the non-cellular networks 130~140 may be a Wireless Local Area Network (WLAN) utilizing the Wi-Fi technology, or may be a Personal Area Network (PAN) utilizing the BT technology, or may be a Zigbee network, or may be a network utilizing another non-cellular technology.

In this embodiment, each of the non-cellular networks 130~140 is illustrated as a WLAN formed by one or more Access Points (APs) utilizing the Wi-Fi technology, and each of the non-cellular networks 130~140 may support wireless communications in different channels (e.g., 14 different channels in 2.4 GHz frequency band, and 60~80 different channels in 5 GHz frequency band). Specifically, each AP may connect to a local area network by an Ethernet cable, and they typically receive, buffer, and transmit data traffic, which is to be directed to and from the mobile communication device 110. In general, each AP may have, on average, a coverage varying from 20 meters in an area with obstacles (walls, stairways, elevators etc) to 100 meters in an area with a clear line of sight.

It should be understood that the components described in the embodiment of FIG. 1 are for illustrative purposes only and are not intended to limit the scope of the application. For example, the wireless communication environment 100 may include other mobile communication devices that connect to the same non-cellular network as the mobile communication device 110 does, and channel congestion of that non-cellular network may occur but may be detected and avoided by the mobile communication device 110 by applying the methods of the present application.

Figure 2:
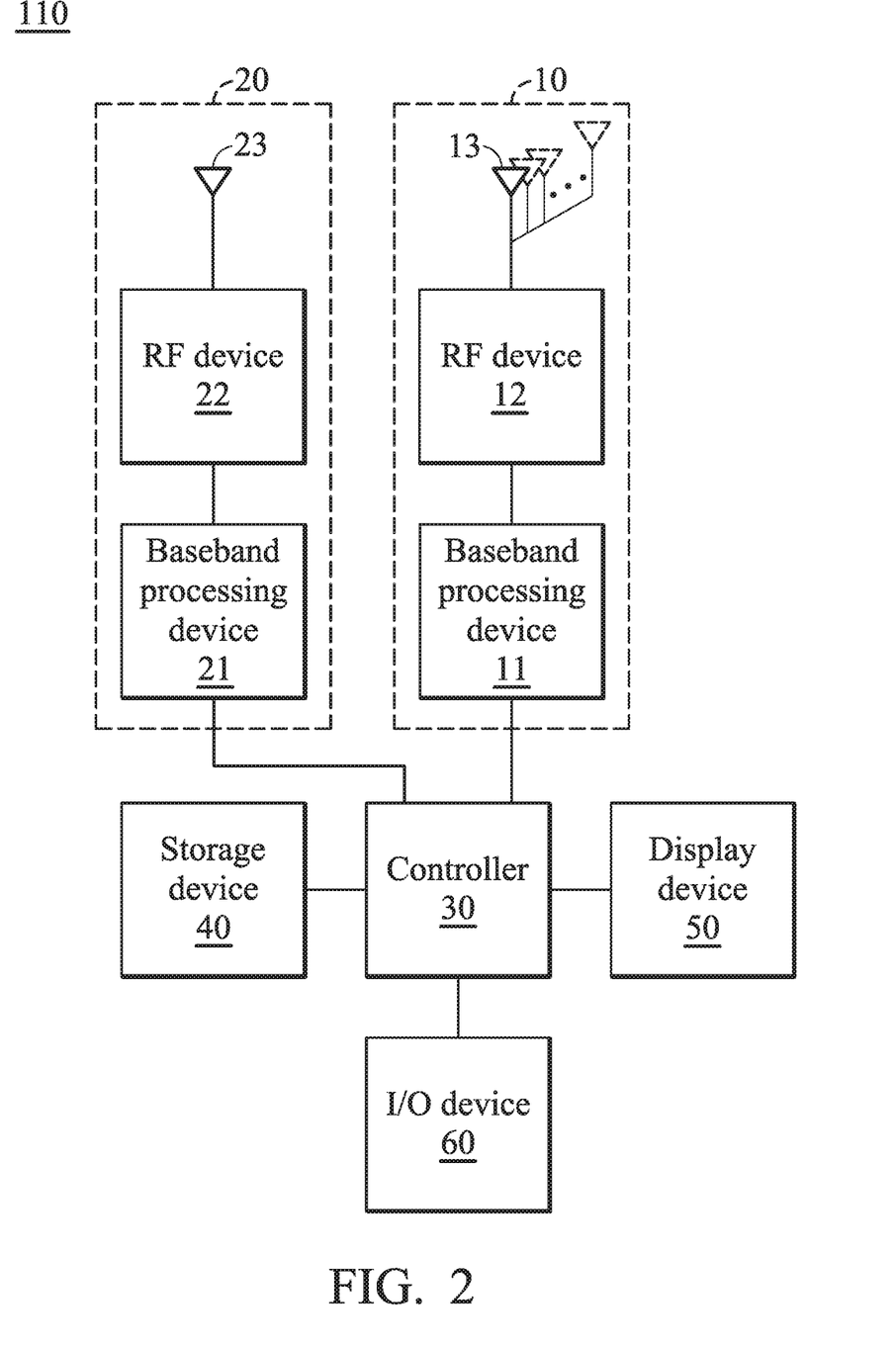
FIG. 2 is a block diagram illustrating the mobile communication device 110 according to an embodiment of the application.

FIG. 2 is a block diagram illustrating the mobile communication device 110 according to an embodiment of the application.

As shown in FIG. 2, the mobile communication device 110 may include two wireless transceivers 10 and 20, a controller 30, a storage device 40, a display device 50, and an Input/Output (I/O) device 60.

The wireless transceiver 10 is configured to perform wireless transmission and reception to and from the cellular network 120.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. In one embodiment, the subscriber identity card may be a Subscriber Identity Module (SIM) card or a Universal SIM (USIM) card, and may be inserted into a socket of the mobile communication device 110. In another embodiment, the subscriber identity card may be a virtual SIM/USIM or soft SIM/USIM, and may be embedded inside the mobile communication device 110 (e.g., may be written into the storage device 40). The baseband processing device 11 may contain multiple hardware components, such as a baseband processor, to perform the baseband signal processing, such as Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 900 MHz, 2100 MHz, or 2.6 GHz utilized in LTE/LTE-A/TD-LTE systems, or any radio frequency (e.g., sub-6 GHz, 24.25 GHz~52.6 GHz for mmWave) utilized in 5G (e.g., NR) systems, or another radio frequency, depending on the cellular technology in use.

The wireless transceiver 20 is configured to perform wireless transmission and reception to and from the non-cellular networks 130~140. In one embodiment, the wireless transceiver 20 may be realized as a Wi-Fi chip if the non-cellular technology utilized by the non-cellular networks 130~140 is the Wi-Fi technology.

Also, the wireless transceiver 20 is capable of detecting/determining the idle timeslot count and the total timeslot count of each channel used by the non-cellular networks 130~140, and detecting/determining the signal quality indicators of the non-cellular networks 130~140. The idle timeslot count refers to the number of idle timeslots, and the total timeslot count refers to the number of all timeslots (including idle timeslots and busy timeslots), wherein both the idle timeslot count and the total timeslot count accumulate in time. The signal quality indicator of a non-cellular network may include any combination of: a Received Signal Strength Indicator (RSSI), a Packet Error Rate (PER), a Bit Error Rate (BER), a Signal-to-Noise Ratio (SNR), and an Interference-to-Signal Ratio (ISR).

Specifically, the wireless transceiver 20 may include a baseband processing device 21, an RF device 22, and an antenna 23.

The baseband processing device 21 is configured to perform baseband signal processing. The baseband processing device 21 may contain multiple hardware components, such as a baseband processor, to perform the baseband signal processing, such as ADC/DAC, gain adjusting, modulation/demodulation, encoding/decoding, and so on.

The RF device 22 may receive RF wireless signals via the antenna 23, convert the received RF wireless signals to baseband signals, which are processed by the baseband processing device 21, or receive baseband signals from the baseband processing device 21 and convert the received baseband signals to RF wireless signals, which are later transmitted via the antenna 23. The RF device 22 may also contain multiple hardware devices to perform radio frequency conversion. For example, the RF device 22 may include a mixer to multiply the baseband signals with a carrier oscillated in the radio frequency of the supported non-cellular technologies, wherein the radio frequency may be 2.4 GHz or 5 GHz utilized in Wi-Fi systems, or may be 2.402~2.480 GHz utilized in BT systems, or another radio frequency, depending on the non-cellular technology in use.

In another embodiment, the wireless transceivers 10 and 20 may be incorporated into a single wireless transceiver. That is, the single wireless transceiver may include a combo RF device to support wireless transceiving to and from the cellular network 120 and the non-cellular networks 130~140.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data (including video data and other types of data) processing and computing, controlling the wireless transceiver 10 for wireless communications with the cellular network 120, controlling the wireless transceiver 20 for wireless communications with the non-cellular networks 130~140, requesting certain information (e.g., the idle timeslot count, the total timeslot count, and the signal quality indicators) from the wireless transceiver 20, storing and retrieving data (e.g., program code) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the methods for data traffic switching and network selection.

In another embodiment, the controller 30 may be incorporated into the baseband processing device 11 or the baseband processing device 21, to serve as a baseband processor.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the channels used by available non-cellular networks, the idle timeslot ratios of the channels used by available non-cellular networks, and the signal quality indicators of available non-cellular networks), instructions, and/or program code of applications, communication protocols, and/or the method for IDC interference prevention.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the mobile communication device 110 may include more components, such as a video decoder for processing video signals, a Global Positioning System (GPS) device for use of some location-based services or applications, and/or a battery for powering the other components of the mobile communication device 110, etc. Alternatively, the mobile communication device 110 may include fewer components. For example, the mobile communication device 110 may not include the display device 50 and/or the I/O device 60.

Figure 3A:
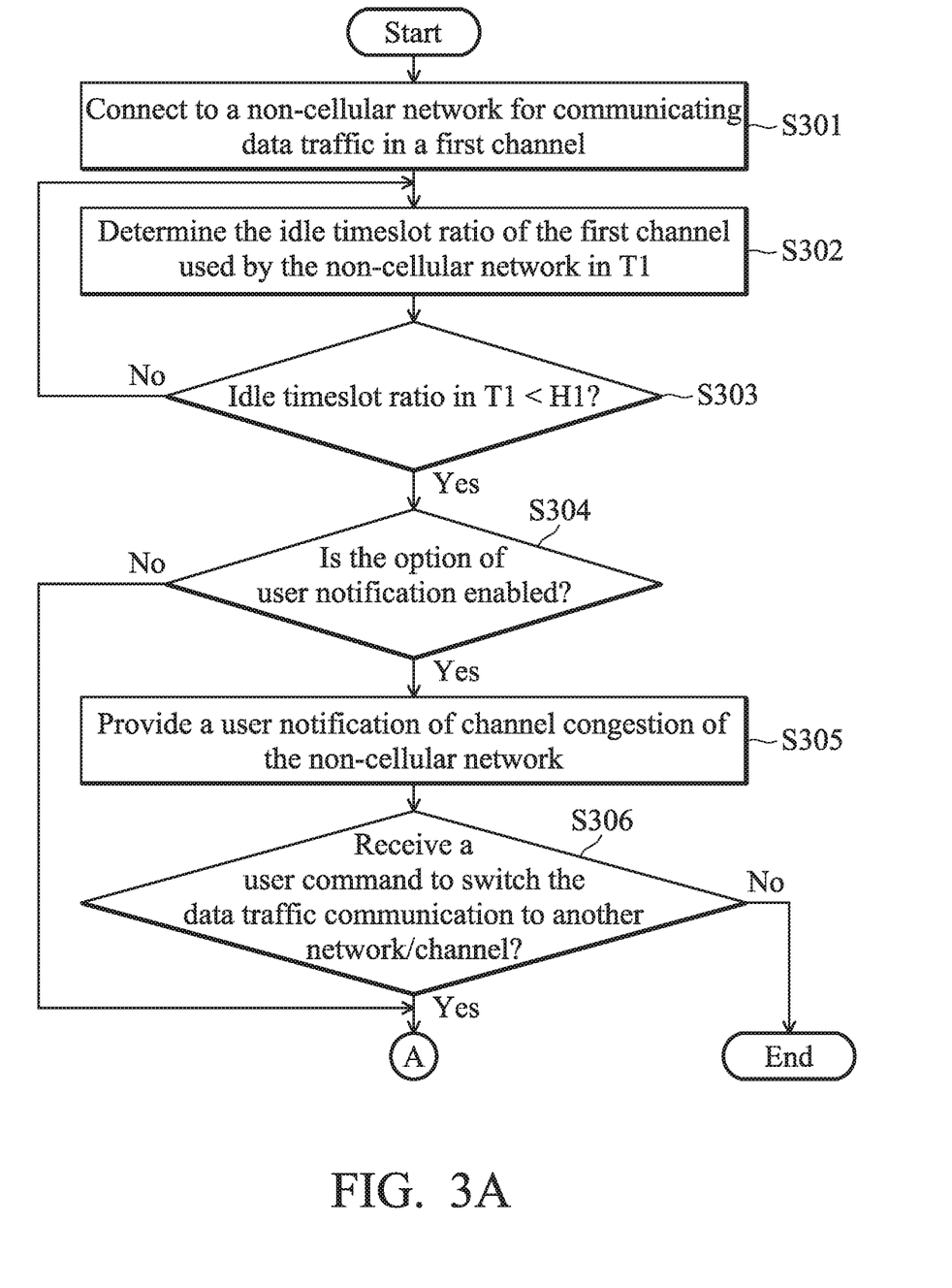
FIGS. 3A and 3B show a flow chart illustrating the method for data traffic switching according to an embodiment of the application.
Figure 3B:
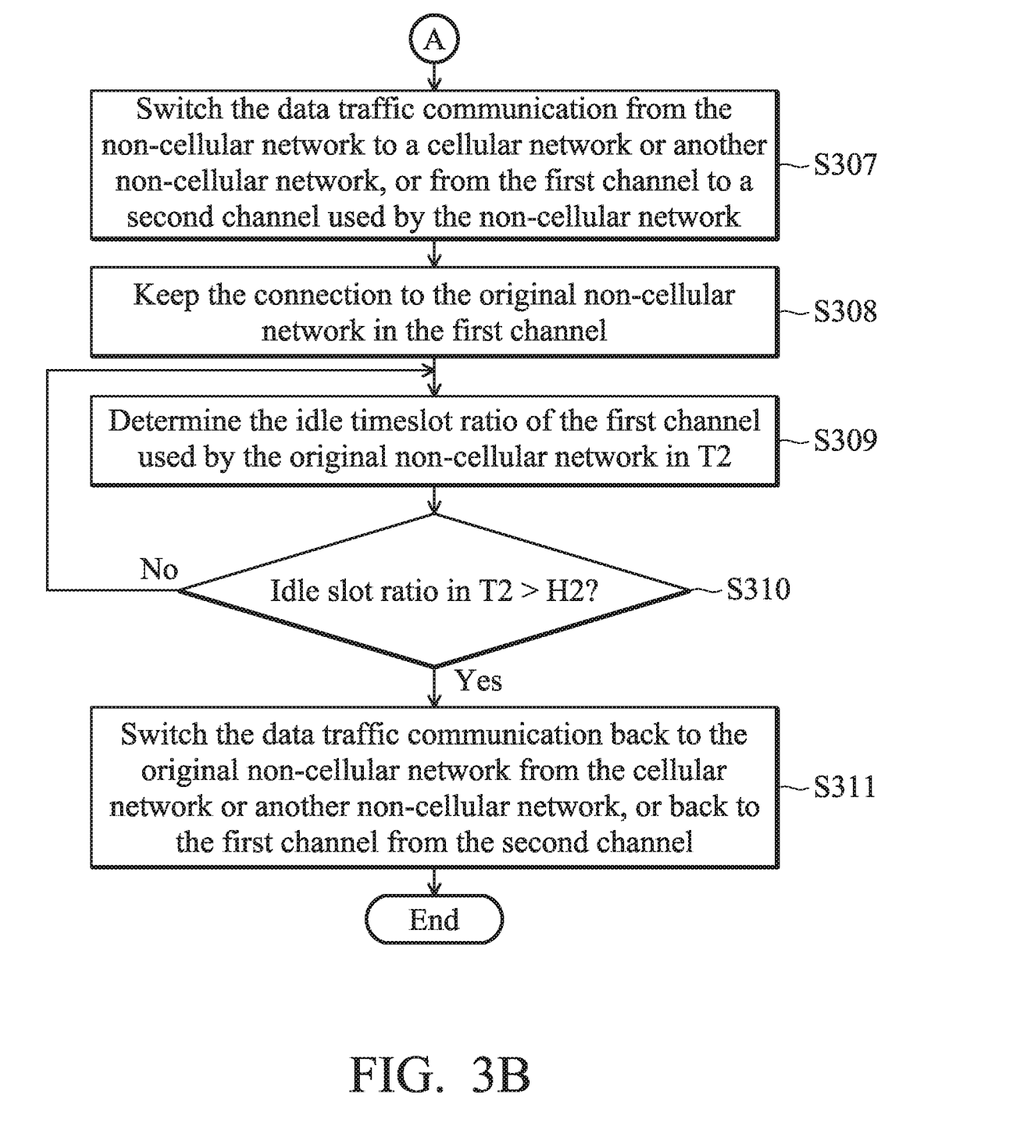

FIGS. 3A and 3B show a flow chart illustrating the method for data traffic switching according to an embodiment of the application.

In this embodiment, the method for data traffic switching may be applied to and executed by a mobile communication device (e.g., the mobile communication device 110).

To begin with, the mobile communication device connects to a non-cellular network for communicating data traffic in a first channel (step S301).

Next, the mobile communication device determines the idle timeslot ratio of the first channel used by the non-cellular network in a first period of time (denoted as T1 in FIG. 3) (step S302).

Specifically, the mobile communication device determines the idle timeslot count and the total timeslot count of the first channel used by the non-cellular network in the first period of time, and the idle timeslot ratio refers to the ratio of the idle timeslot count to the total timeslot count.

For example, the first period of time may be 1 second long. During this second, the wireless transceiver 20 is awake for 0.8 second and there are 111111 slots in total (assuming that each slot is 9 milliseconds long). Note that the idle timeslot count accumulates in time, so if the idle timeslot count accumulated at the last second is 100000 and the idle timeslot count accumulated at this second is 160000, then the idle timeslot count in this second long is 60000. Therefore, the idle timeslot ratio may be determined to be (60000/0.8)/111111=0.675 (i.e., 67.5%).

Subsequently, the mobile communication device determines whether the idle timeslot ratio in the first period of time is lower than a first threshold (denoted as H1 in FIG. 3) (step S303).

Subsequent to step S303, if the idle timeslot ratio in the period of time is lower than the first threshold (which means that channel congestion of the non-cellular network has occurred), the mobile communication device determines whether the option of user notification is enabled (step S304).

Subsequent to step S304, if the option of user notification is enabled, the mobile communication device provides a notification to the user of the mobile communication device (step S305). The notification may indicate that channel congestion of the non-cellular network has occurred or that the idle timeslot ratio in the period of time is lower than the first threshold.

Subsequent to step S305, the mobile communication device determines whether a user command indicating to switch the data traffic communication to another network/channel has been received (step S306).

Subsequent to step S306, if a user command indicating to switch the data traffic communication to another network/channel has been received, the mobile communication device switches the data traffic communication from the non-cellular network to a cellular network or another non-cellular network or from the first channel to a second channel used by the non-cellular network (step S307).

Subsequent to step S306, if a user command indicating to switch the data traffic communication to another network/channel has not been received, the method ends (i.e., the data traffic communication stays in the non-cellular network and continues the data traffic communication in the first channel).

Subsequent to step S304, if the option of user notification is not enabled, the method proceeds to step S307.

Subsequent to step S303, if the idle timeslot ratio in the period of time is greater than the first threshold, the method goes back to step S302.

Subsequent to step S307, the mobile communication device keeps the connection to the original non-cellular network in the first channel (step S308).

In another embodiment, step S308 may be performed before step S307, or may be incorporated into step S307.

Next, the mobile communication device determines the idle timeslot ratio of the first channel used by the original non-cellular network in a second period of time (denoted as H2 in FIG. 3) (step S309).

Subsequently, the mobile communication device determines whether the idle timeslot ratio in the second period of time is greater than a second threshold (denoted as H2 in FIG. 3) (step S310).

Subsequent to step S310, if the idle timeslot ratio in the second period of time is greater than the second threshold, the mobile communication device may switch the data traffic communication back to the original non-cellular network from the cellular network or another non-cellular network, or back to the first channel from the second channel (step S311), and the method ends.

Subsequent to step S310, if the idle timeslot ratio in the second period of time is lower than the second threshold, the method may go back to step S309.

Figure 4A:
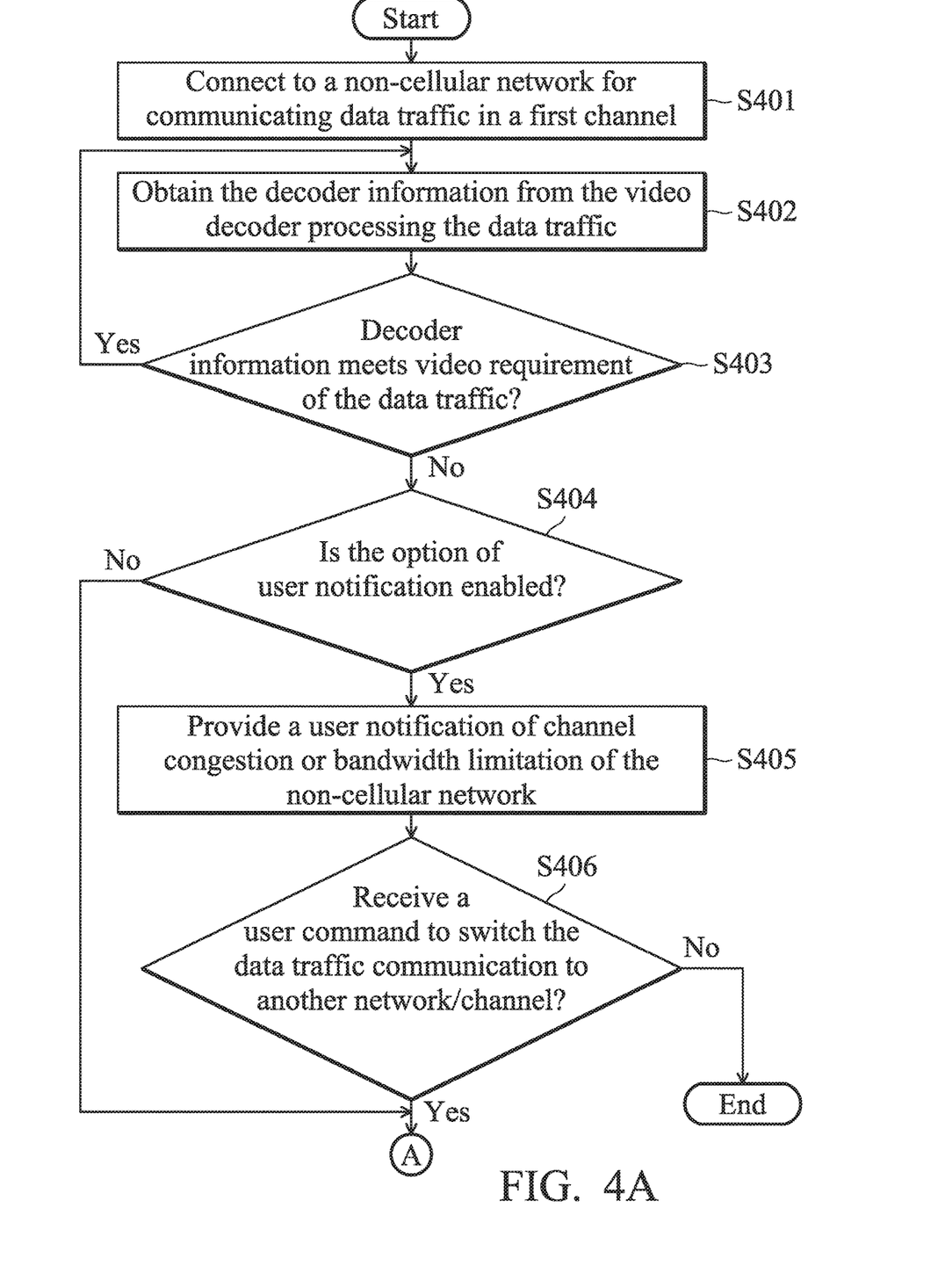
FIGS. 4A and 4B show a flow chart illustrating the method for data traffic switching according to another embodiment of the application.
Figure 4B:
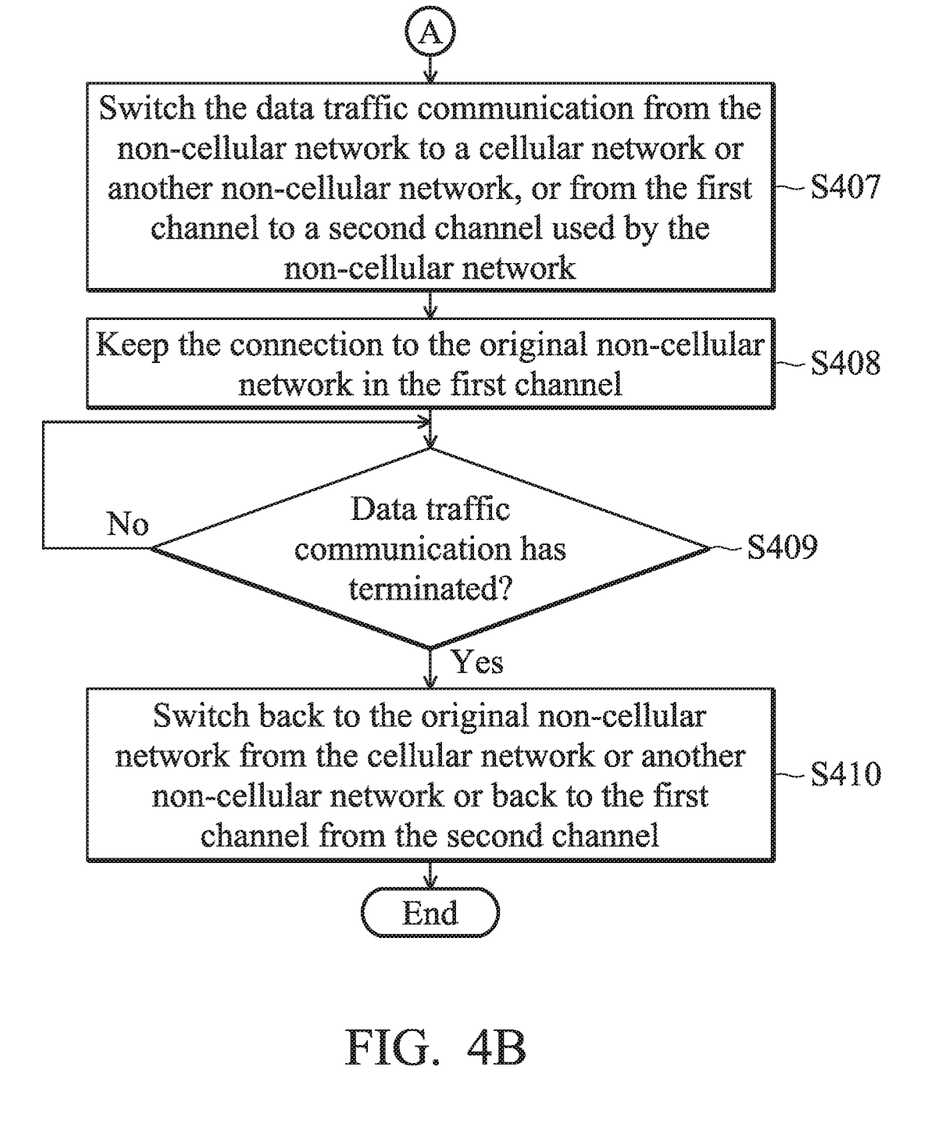

FIGS. 4A and 4B show a flow chart illustrating the method for data traffic switching according to another embodiment of the application.

In this embodiment, the method for data traffic switching may be applied to and executed by a mobile communication device (e.g., the mobile communication device 110).

To begin with, the mobile communication device connects to a non-cellular network for communicating video traffic in a first channel (step S401).

Next, the mobile communication device obtains the decoder information from the video decoder processing the data traffic (step S402). In this embodiment, the data traffic specifically includes video traffic.

Specifically, the video decoder may be realized as part of the circuits in the controller 30, or may be realized in an Integrated Circuit (IC) chip, which is responsible for video signal processing.

The decoder information may include at least one of the following: the resolution of the decoded video, the frame rate of the decoded video, the frame error rate of the decoded video, and the bitrate of the decoded video.

Subsequently, the mobile communication device determines whether the decoder information meets the video requirement of the data traffic (step S403).

The video requirement of the data traffic may include at least one of the following: the resolution of the source video, the frame rate of the source video, the frame error rate of the source video, and the bitrate of the source video.

For example, the source video may require a frame rate of 30 frames per second (fps), and if the frame rate of the decoded video is less than 30 fps (e.g., the frame rate of the decoded video is 3 fps), then it is determined that the decoder information does not meet the video requirement of the data traffic.

Subsequent to step S403, if the decoder information does not meet the video requirement of the data traffic (which means that channel congestion or bandwidth limitation of the non-cellular network has occurred), the mobile communication device determines whether the option of user notification is enabled (step S404).

Subsequent to step S404, if the option of user notification is enabled, the mobile communication device provides a notification to the user of the mobile communication device (step S405). The notification may indicate that channel congestion or bandwidth limitation of the non-cellular network has occurred or that the decoder information does not meet the video requirement of the data traffic.

Subsequent to step S405, the mobile communication device determines whether a user command indicating to switch the data traffic communication to another network/channel has been received (step S406).

Subsequent to step S406, if a user command indicating to switch the data traffic communication to another network/channel has been received, the mobile communication device may switch the data traffic communication from the non-cellular network to a cellular network or another non-cellular network or from the first channel to a second channel used by the non-cellular network (step S407).

Subsequent to step S403, if the decoder information meets the video requirement of the data traffic, the method goes back to step S402.

Subsequent to step S407, the mobile communication device keeps the connection to the original non-cellular network in the first channel (step S408).

In another embodiment, step S408 may be performed before step S407, or may be incorporated into step S407.

Next, the mobile communication device determines whether the data traffic communication has terminated (step S409).

Subsequent to step S409, if the data traffic communication has terminated, the mobile communication device may switch back to the original non-cellular network from the cellular network or another non-cellular network or back to the first channel from the second channel (step S410), and the method ends.

Subsequent to step S409, if the video traffic communication continues, the method may go back to step S409.

Figure 5:
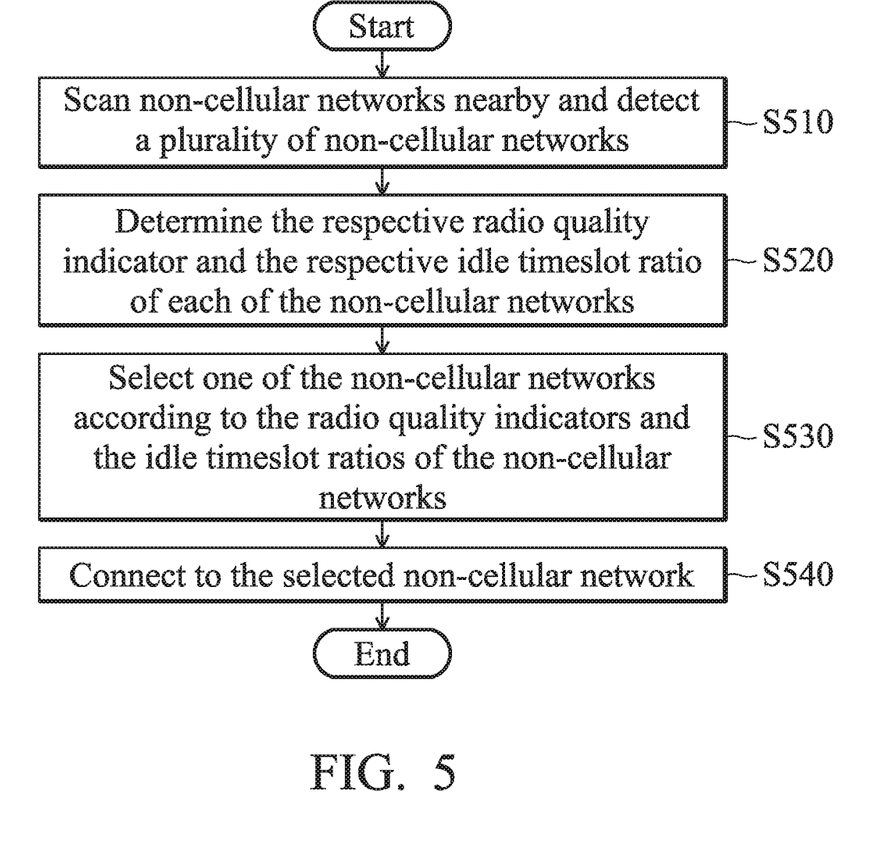
FIG. 5 is a flow chart illustrating the method for network selection according to an embodiment of the application.

FIG. 5 is a flow chart illustrating the method for network selection according to an embodiment of the application.

In this embodiment, the method for network selection may be applied to and executed by a mobile communication device (e.g., the mobile communication device 110).

To begin with, the mobile communication device scans non-cellular networks nearby and detects a plurality of non-cellular networks (step S510).

In one embodiment, each of the non-cellular networks may be formed by an AP utilizing the Wi-Fi technology, and the non-cellular networks may belong to the same Extended Service Set (ESS).

Next, the mobile communication device determines the respective radio quality indicator and the respective idle timeslot ratio of each of the non-cellular networks (step S520).

Specifically, the radio quality indicator may include one or more of the following: RSSI, PER, BER, SNR, and ISR, etc.

Subsequently, the mobile communication device selects one of the non-cellular networks according to the radio quality indicators and the idle timeslot ratios of the non-cellular networks (step S530).

In one embodiment, step S530 may be performed by ranking the non-cellular networks according to the radio quality indicators of the non-cellular networks, and then checking the non-cellular networks, one by one, from the top of the ranking list to determine whether the idle timeslot ratio of the non-cellular network being checked is greater than a threshold. If the idle timeslot ratio of the non-cellular network being checked is greater than the threshold, this non-cellular network is selected. Otherwise, if the idle timeslot ratio of the non-cellular network being checked is lower than the threshold, the next non-cellular network in the ranking list will be checked.

In another embodiment, step S530 may be performed by determining the respective weighted sum of the radio quality indicator and the idle timeslot ratio of each of the non-cellular networks, and then ranking the non-cellular networks according to the weighted sums. The top-ranked non-cellular network is selected.

After that, the mobile communication device connects to the selected non-cellular network (step S540), and the method ends.

In view of the forgoing embodiments, it will be appreciated that the present application realizes smart data traffic switching and network selection, by using at least the idle timeslot ratio or video decoder information to detect the occurrence of channel congestion and bandwidth limitation of the currently connected non-cellular network. Advantageously, the wireless communication throughput and user experience may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, executed by a mobile communication device, comprising:
   connecting to a non-cellular network for communicating data traffic in a first channel;
   determining an idle timeslot ratio of the first channel used by the non-cellular network in a first period of time; and
   in response to the idle timeslot ratio in the first period of time being lower than a first threshold, switching the data traffic communication from the non-cellular network to a cellular network or another non-cellular network, or switching the data traffic communication from the first channel to a second channel used by the non-cellular network, or providing a notification to a user of the mobile communication device.

2. The method as claimed in claim 1, wherein the determining of the idle timeslot ratio of the first channel used by the non-cellular network in the first period of time comprises:

determining an idle timeslot count and a total timeslot count of the first channel used by the non-cellular network in the first period of time;

wherein the idle timeslot ratio in the first period of time is a ratio of the idle timeslot count to the total timeslot count.

3. The method as claimed in claim 1, further comprising:

keeping the connection to the non-cellular network in the first channel;

determining an idle timeslot ratio of the first channel used by the non-cellular network in a second period of time; and switching the data traffic communication back to the non-cellular network from the cellular network or another non-cellular network or back to the first channel from the second channel, in response to the idle timeslot ratio in the second period of time being greater than a second threshold.

4. The method as claimed in claim 3, wherein the second threshold is greater than the first threshold.

5. The method as claimed in claim 1, wherein the non-cellular network is formed by an Access Point (AP) utilizing a Wireless-Fidelity (Wi-Fi) technology.

6. A method, executed by a mobile communication device, comprising:

connecting to a non-cellular network for communicating data traffic in a first channel;

obtaining decoder information from a video decoder processing the data traffic; and in response to the decoder information not meeting a video requirement of the data traffic, switching the data traffic communication from the non-cellular network to a cellular network or another non-cellular network, or switching the data traffic communication from the first channel to a second channel used by the non-cellular network, or providing a notification to a user of the mobile communication device.

7. The method as claimed in claim 6, further comprising:

keeping the connection to the non-cellular network in the first channel; and switching back to the non-cellular network from the cellular network or another non-cellular network or back to the first channel from the second channel, in response to the data traffic communication having been terminated.

8. The method as claimed in claim 6, wherein the decoder information comprises at least one of the following:

resolution of a decoded video;
frame rate of the decoded video;
frame error rate of the decoded video; and
bitrate of the decoded video.

9. The method as claimed in claim 6, wherein the video requirement of the data traffic comprises at least one of the following:

resolution of a source video;
frame rate of the source video;
frame error rate of the source video; and
bitrate of the source video.

10. The method as claimed in claim 6, wherein the non-cellular network is formed by an Access Point (AP) utilizing a Wireless-Fidelity (Wi-Fi) technology.

11. A method, executed by a mobile communication device, comprising:

detecting a plurality of non-cellular networks;

determining a respective radio quality indicator and a respective idle timeslot ratio of each of the non-cellular networks;

selecting one of the non-cellular networks according to the radio quality indicators and the idle timeslot ratios of the non-cellular networks; and connecting to the selected non-cellular network.

12. The method as claimed in claim 11, wherein the selecting of one of the non-cellular networks according to the radio quality indicators and the idle timeslot ratios of the non-cellular networks comprises:

ranking the non-cellular networks according to the radio quality indicators of the non-cellular networks;

determining whether the idle timeslot ratio of the top-ranked non-cellular network is greater than a threshold; and selecting the top-ranked non-cellular network in response to the idle timeslot ratio of the top-ranked non-cellular network being greater than the threshold.

13. The method as claimed in claim 12, wherein the selecting of one of the non-cellular networks according to the radio quality indicators and the idle timeslot ratios of the non-cellular networks comprises:

determining whether the idle timeslot ratio of the next-top-ranked non-cellular network is greater than the threshold in response to the idle timeslot ratio of the top-ranked non-cellular network being lower than the threshold; and selecting the next-top-ranked non-cellular network in response to the idle timeslot ratio of the next-top-ranked non-cellular network being greater than the threshold.

14. The method as claimed in claim 11, wherein the selecting of one of the non-cellular networks according to the radio quality indicators and the idle timeslot ratios of the non-cellular networks comprises:

determining a respective weighted sum of the radio quality indicator and the idle timeslot ratio of each of the non-cellular networks;

ranking the non-cellular networks according to the weighted sums of the non-cellular networks; and selecting the top-ranked non-cellular network.

15. The method as claimed in claim 11, wherein the radio quality indicator comprises at least one of the following:

a Received Signal Strength Indicator (RSSI);
a Packet Error Rate (PER);
a Bit Error Rate (BER);
a Signal-to-Noise Ratio (SNR); and
an Interference-to-Signal Ratio (ISR).

16. The method as claimed in claim 11, wherein the determining of a respective idle timeslot ratio of each of the non-cellular networks comprises:

determining a respective idle timeslot count and a respective total timeslot count of a channel used by each of the non-cellular networks in a period of time;

wherein the idle timeslot ratio is a ratio of the idle timeslot count to the total timeslot count.

17. The method as claimed in claim 11, wherein the non-cellular networks are formed by a plurality of Access Points (APs) utilizing a Wireless-Fidelity (Wi-Fi) technology.

18. The method as claimed in claim 17, wherein the APs belong to the same Extended Service Set (ESS).

* * * * *